(12) United States Patent
Noda et al.

(10) Patent No.: US 7,057,972 B1
(45) Date of Patent: Jun. 6, 2006

(54) FLASHER TYPE FISH SONAR

(75) Inventors: Tetsuya Noda, Toyohashi (JP);
Yoshikazu Muramatsu, Toyohashi (JP)

(73) Assignee: Honda Electronics Co., Ltd.,
Aichi-Ken (JP)

( * ) Notice: Subject to any disclaimer, the term of this patent is extended or adjusted under 35 U.S.C. 154(b) by 0 days.

(21) Appl. No.: 11/301,397

(22) Filed: Dec. 13, 2005

(51) Int. Cl.
*G01S 15/96* (2006.01)

(52) U.S. Cl. .................................. 367/111; 367/109

(58) Field of Classification Search ................ 367/109, 367/111
See application file for complete search history.

(56) References Cited

U.S. PATENT DOCUMENTS

| | | | | |
|---|---|---|---|---|
| 3,964,012 A | * | 6/1976 | Yamamoto et al. | 367/109 |
| 5,973,997 A | * | 10/1999 | Yamamoto et al. | 367/111 |
| 5,999,490 A | * | 12/1999 | Shimauchi et al. | 367/111 |
| 6,650,595 B1 | * | 11/2003 | Asakura | 367/109 |

* cited by examiner

*Primary Examiner*—Ian J. Lobo
(74) *Attorney, Agent, or Firm*—Richard M. Goldberg

(57) ABSTRACT

A flasher type fish sonar includes a case, a circuit board mounted in the case, and a motor attached to the circuit board and including a rotary shaft. A light conducting disk is fixed to the rotary shaft and includes a projecting portion for mounting the light conducting disk, a luminous portion and a light conducting portion for conducting light to the luminous portion. A shadow disk is fixed to the luminous portion and includes a slit through which light passes from the luminous portion. A front display disk is provided in front of the shadow disk. A luminous element is connected with the circuit board opposite to the light conducting portion. A fish sonar circuit inputs signals of a surface of a body of water, fish, and a bottom of the water, and a piezoelectric vibrator is connected to the fish sonar.

3 Claims, 6 Drawing Sheets

FLASHER TYPE FISH SONAR

BACKGROUND OF THE INVENTION

The present invention relates to a flasher type fish sonar in which a light conductor is rotated by a motor, a luminous body is fixed on a circuit board and an emitted light of the luminous body is emitted through a slit of the light conductor.

In a prior flasher type fish sonar, a circular window is formed in the periphery of a display board provided at the front of a case, the luminous body mounted on a rotary disk is arranged opposite to the window, and the rotary disk is rotated by a motor. Also, brushes are in contact with slip rings provided with the rotary shaft of the rotary disk, an input circuit is connected to the brushes and a flasher display is constituted by the rotary disk and luminous body. The input circuit is connected to a transmitting-receiving circuit of a fish sonar. When a signal from the transmitting-receiving circuit is input from the input circuit to the luminous body through the brushes and the slip rings, an upper portion of the rotary disk becomes a starting point showing the surface of the sea, fish are shown in parts emitted by a rotary timing of the luminous body, and the sea bottom is shown in a part near the starting point.

In the prior flasher type fish sonar, however, when the rotary disk having the luminous body is rotated by the motor, digital signals are input from the transmitting-receiving circuit to the input circuit, and the digital signals are supplied from the input circuit to the luminous body through the brushes and the slip rings. However, the lifetime of the brushes and the slip rings becomes short by the wear of the brushes and the slip rings. As a result, the electric current input into the luminous body is changed, because the contact resistance of the brushes and slip rings is changed by the contact wear and the luminosity of luminous body is changed. Thus, the luminosity of the luminous body is not visible, and the luminosity of the fish in the sea is confused with the luminosity of the bottom of the sea when the change of the luminosity of the luminous body becomes large.

SUMMARY OF THE INVENTION

It is, therefore, the primary object of the present invention to provide a flasher type fish sonar in which a contact wear owing to the rotation is not generated.

It is another object of the present invention to provide a flasher type fish sonar in which brushes and slip rings are not used.

It is another object of the present invention to provide a flasher type fish sonar in which contact noise of the brushes and slip rings is not generated and unevenness in rotation is small, because a luminosity from a luminous body is conducted to a display by a light conductor.

In order to accomplish the above and other objects, the present invention comprises a case, a circuit board mounted in the case, a motor attached on the circuit board, a light conducting disk fixed on a rotary shaft of the motor, a shadow disk fixed to a luminous portion of the light conducting disk, the shadow disk being formed with a slit through which light passes from the luminous portion of the light conducting disk, a front display disk provided at the front of the shadow disk, a luminous element fixed the circuit board opposite to the conductive portion of the light conducting disk for conducting light from the luminous body, a fish sonar circuit for inputting signals of a surface of the water, fish and the bottom of the sea, and a piezoelectric vibrator connected to the fish sonar.

DESCRIPTION OF THE PREFERRED EMBODIMENTS

Figure 1:
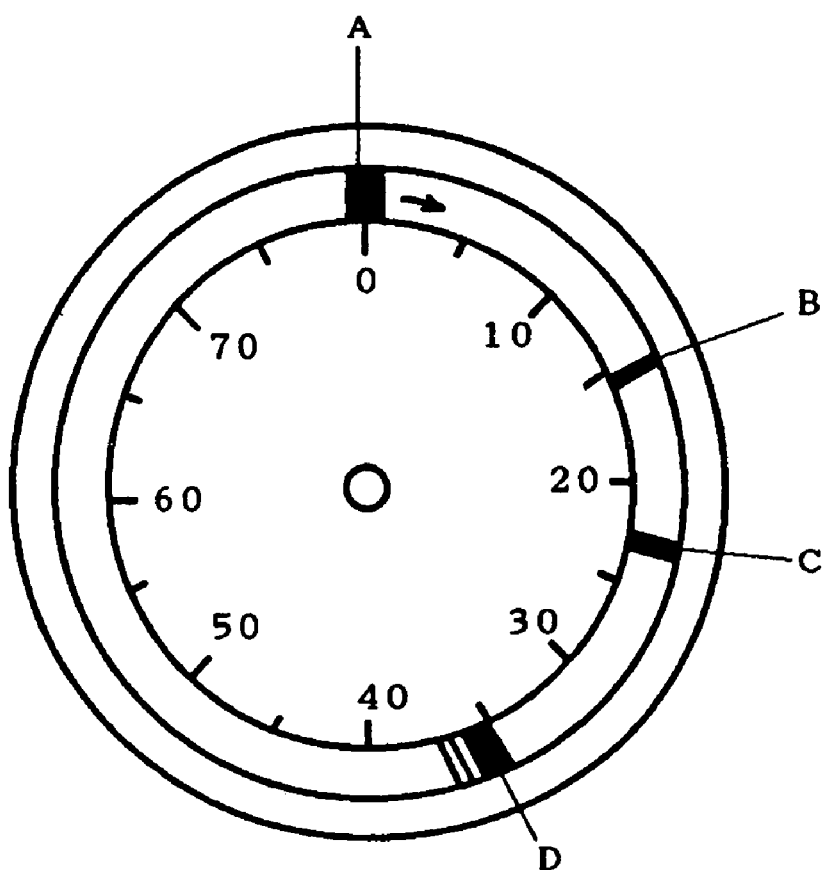
FIG. 1 shows a front plan view of a display of a flasher type fish sonar according to the prior art.
Figure 2:
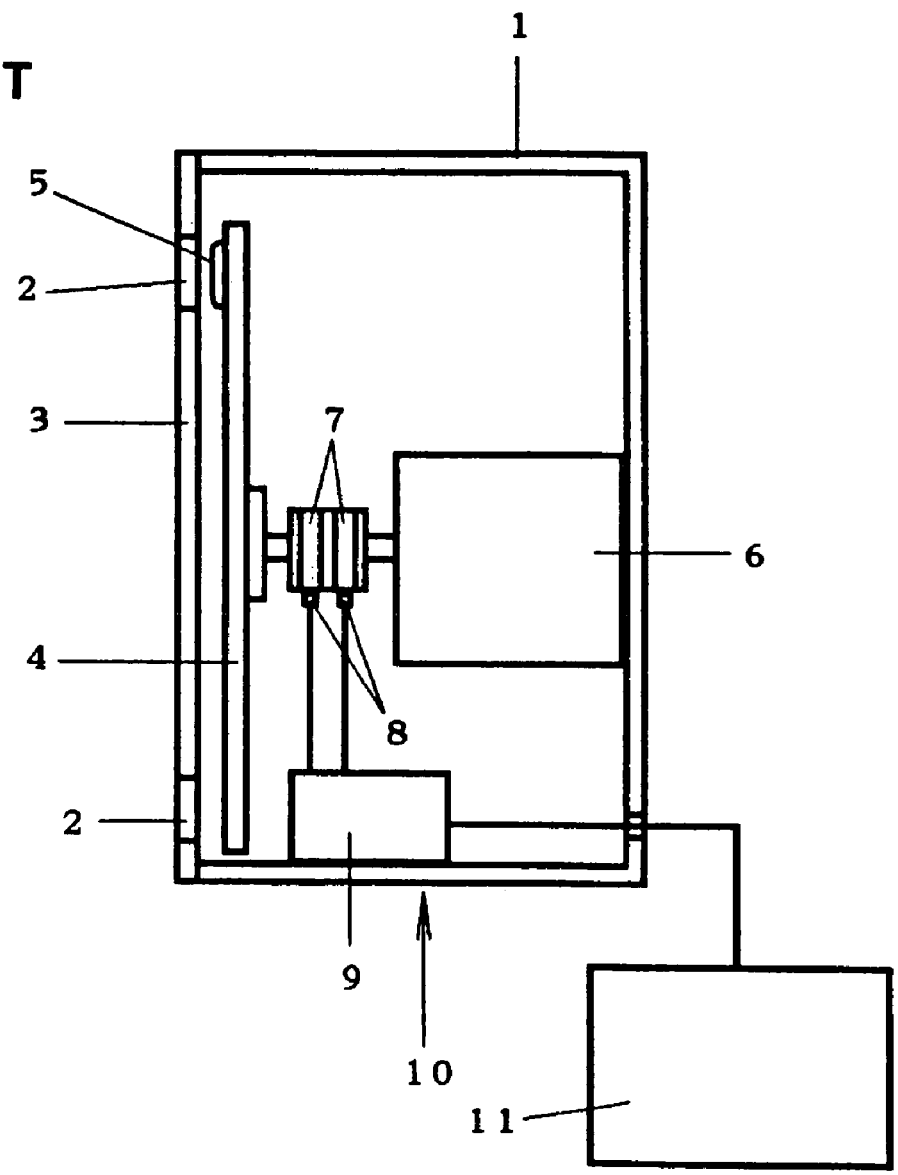
FIG. 2 shows an opened side view of the display of FIG. 1.

In a prior flasher type fish sonar, as shown in FIGS. 1 and 2, a circular window 2 is formed in the periphery of a display board 3 provided at the front of a case 1, the luminous body 5 mounted on a rotary disk 4 is arranged opposite to the window 2, and the rotary disk 4 is constituted to be rotated by a motor 6. Brushes 8 are in contact with slip rings 7 attached to the rotary shaft of the rotary disk 4, an input circuit 9 is connected to the brushes 8, and a flasher display 10 is constituted by these elements. A transmitting-receiving circuit 11 is connected to the input circuit 9. When a signal is input from the transmitting-receiving circuit 11 to the input circuit 9, and then supplied from the input circuit 9 to the luminous body 5 through the brushes 8 and the slip rings 7, a part A of the flasher display 10 becomes a starting point of the luminosity of the luminous body 5. The starting point is shown as the surface of the sea, while fish are shown by parts B and C and the bottom of the sea is shown by a part D.

In the prior flasher type fish sonar, however, when the rotary disk 4 on which the luminous body is mounted is rotated by the motor 6 and the digital signals are input from the transmitting-receiving circuit 11 to the input circuit 9, the digital signals are supplied through the brushes 8 and the slip rings 7 from the input circuit 9 to the luminous body 5. Then, the lifetime of the brushes 8 and the slip rings 7 becomes short by the wear due to the rotation of the brushes 8 and the slip rings 7. As a result, the electric current input into the luminous body 5 is changed, because the contact resistance of the brushes 8 and slip rings 7 is changed by the contact wear and the luminosity of luminous body 5 is changed. Thus, the luminosity of luminous body 5 is not visible, and the luminosity of the fish in the sea is confused with the luminosity of the bottom of the sea when the change of the luminosity of the luminous body 5 becomes large.

Figure 3:
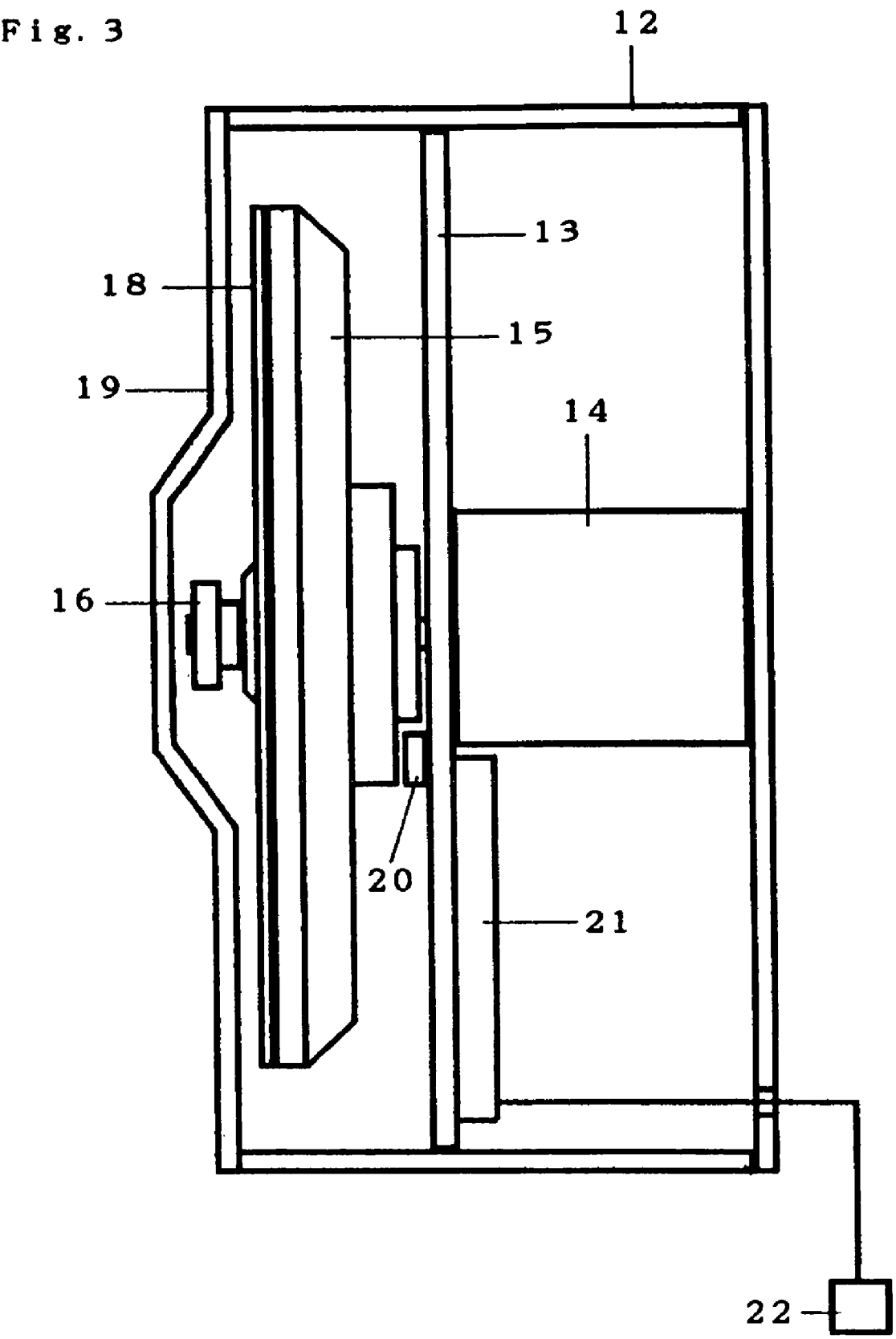
FIG. 3 shows an opened side view of a display of the flasher type fish sonar according to the present invention.
Figure 4:
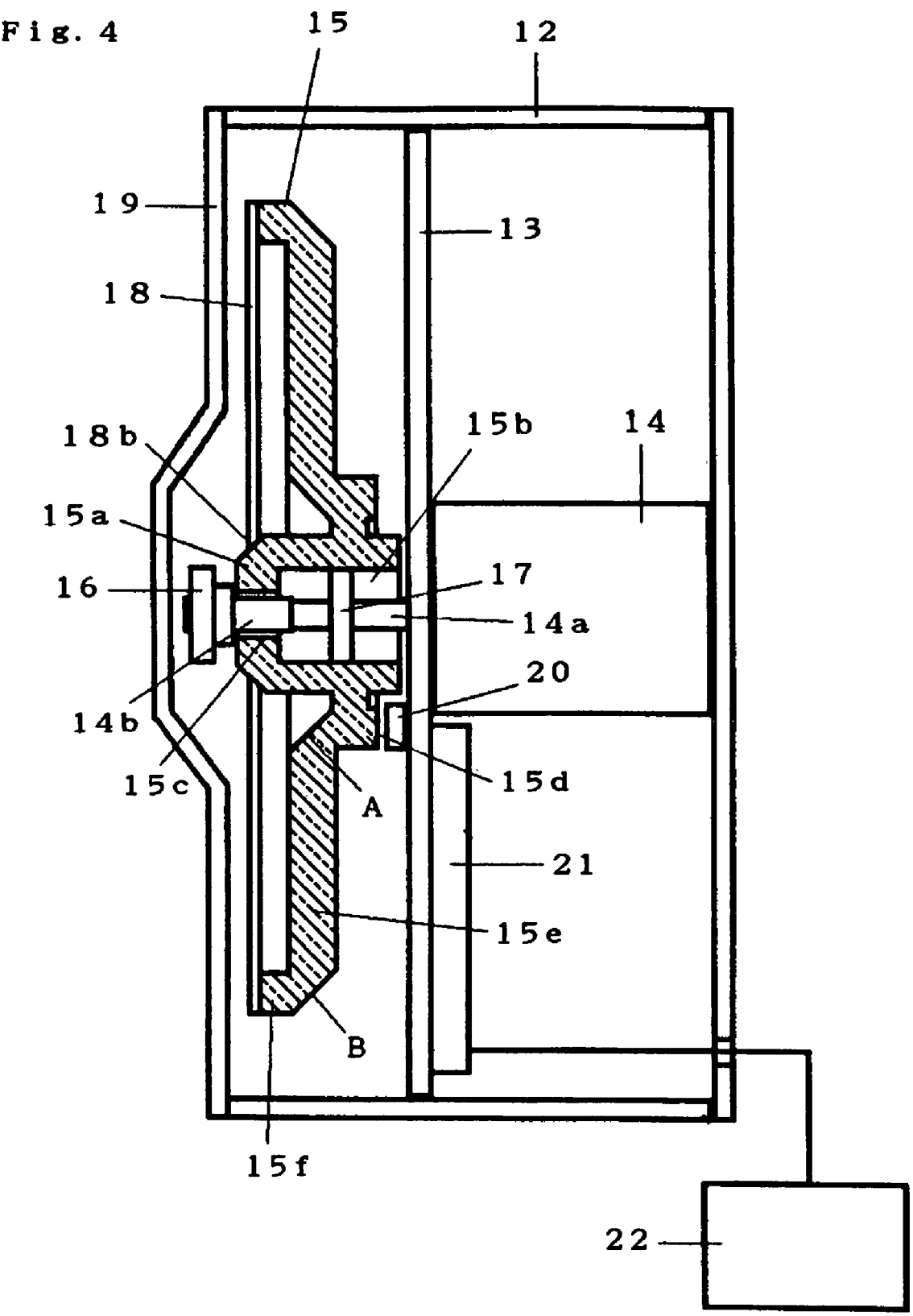
FIG. 4 shows an opened side view, partly in section, of the display of FIG. 3.

Referring to FIGS. 3 and 4, a circuit board 13 is mounted inside of a case 12, and a motor 14 is mounted on the circuit board 13. A rotary shaft 14a of motor 14 is passed through a hollow portion 15b of a central hub projecting portion 15a formed in a light conducting disk 15, and a threaded portion 14b of the rotary shaft 14a is engaged with a threaded portion 15c of the central hub projecting portion 15a and has a nut 16 thereon. The light conducting disk 15 is thereby fixed to the rotary shaft 14a of the motor 14 by the nut 16 and a fixed part 17 is attached to the inside of the hollow portion 15b.

Figure 5:
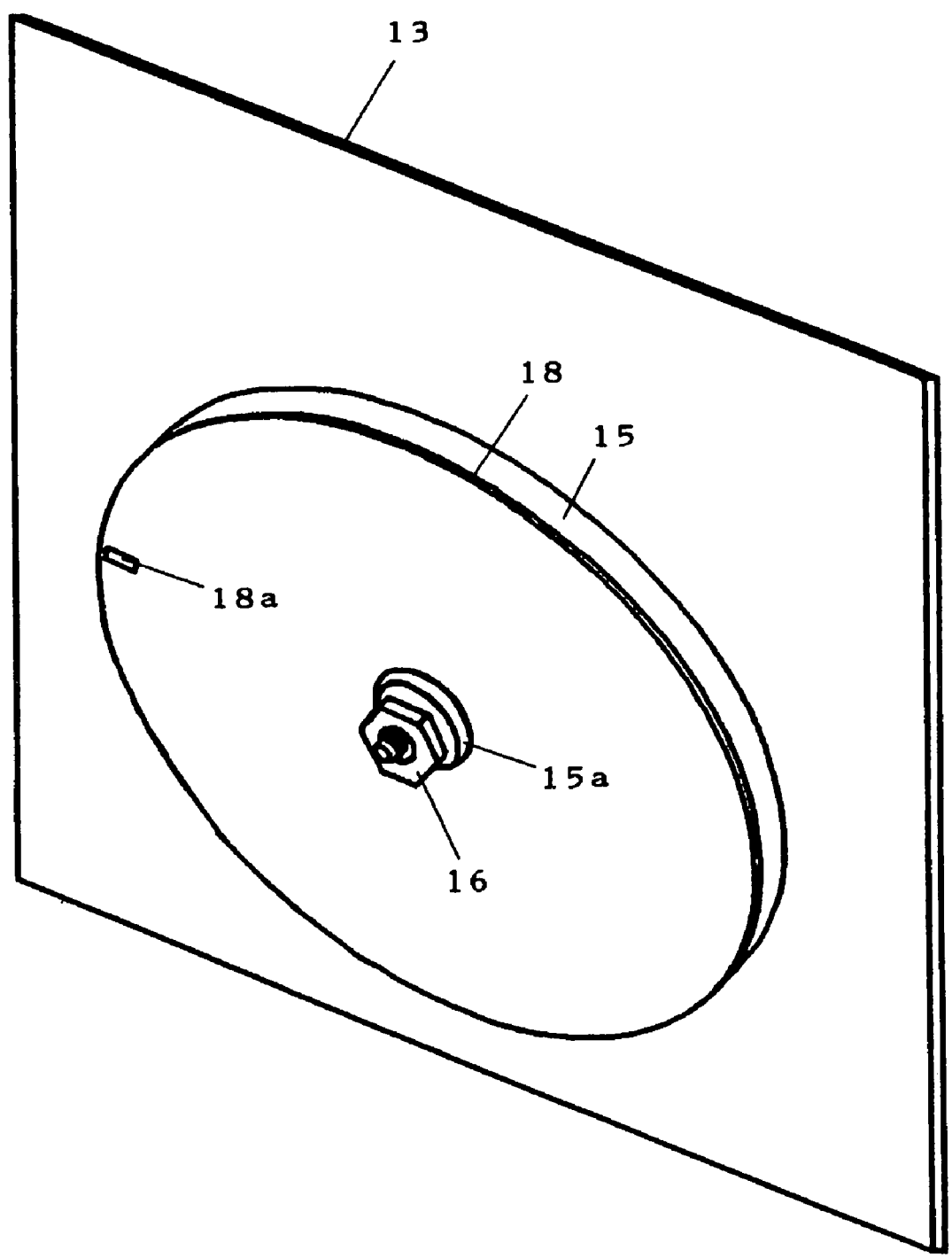
FIG. 5 shows a perspective view of the display of FIG. 3.

A light conducting portion 15d is formed at a periphery of the central hub projecting portion 15a, and a disk portion 15e is formed to the outside of the light conducting portion 15*d*, concentrically with respect to the central hub projecting portion 15*a*. A light emitting portion 15*f* is formed at the edge of the disk portion 15*e*, and a shadow disk 18 is fixed to the light emitting portion 15*f*. As shown in FIG. 5, a slit 18*a* is formed in the shadow disk 18 at the light emitting portion 15*f*, the central hub projecting portion 15*a* projects from the center hole 18*b*, and the center hole 18*b* of the shadow disk 18 is fixed to the central hub projecting portion 15*a* of the light conducting disk 15.

Figure 6:
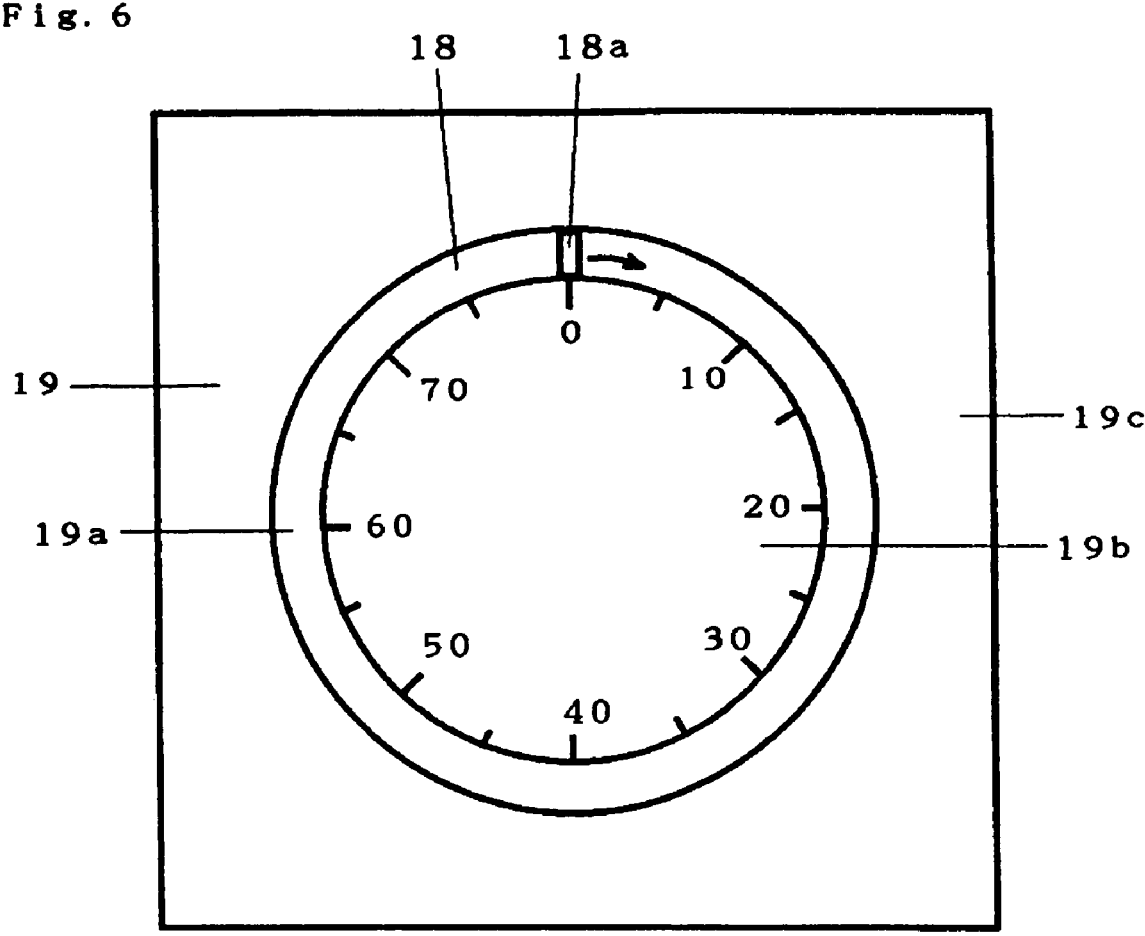
FIG. 6 shows a front plan view of the display of FIG. 3.

A front display 19, as shown in FIG. 6, is attached to the front of the case 12 and the shadow disc 18. The front display 19 is divided into an annular transparent portion 19*a* and an opaque central circular portion 19*b* at the inside. The outside of the circular transparent portion 19*a* is from where the light from the slit 18*a* is passed through. A graduation 19*b* showing a depth of the sea is provided on the opaque portion 19*b*.

A luminous body 20 is fixed to the circuit board 13 opposite to the light conducting portion 15*d* and is connected to a fish sonar circuit 21, and a piezoelectric vibrator 22 is connected to the fish sonar circuit 21 and is thrown into the sea.

In the flasher type fish sonar in the present invention, when the motor 14 is driven, the light conducting disk 15 is rotated, and the signals of the surface, the bottom and fish are input to the fish sonar circuit 21 from the piezoelectric vibrator 22, and timing signals for emitting light from the luminous body 20 are input to the luminous body 20 from the fish sonar circuit 21. Since the luminous body 20 emits light by the timing signals, the emitted light is applied to the light conducting portion 15*d* of the light conducting disk 15, is reflected by the reflecting portion A of luminous body 5, is reflected by the reflecting portion B through the disk portion 15*e*, and the emitted light is emitted from the light emitting portion 15*f*. Then, the emitted light is emitted from the slit 18*a* of the shadow disk 18 fixed to the light emitting portion 15*f* in each timing. The surface of the sea is shown near 0 in the front display 19, and the luminous body 20 emits light which is displayed in order of the surface, the fish and the bottom.

As described above, in the flasher type fish sonar in the present invention, because the luminous body 20 is fixed on the circuit board 13, the light conducting disk 15 is rotated by the motor 14, and the light emitted from the light emitting portion 15*f* of the light conducting disk 15 is emitted through the slit 18*a* of the shadow disk 18, so that the surface, the fish and the bottom are displayed on the display disk 19. Further, no slip ring or brush is not used, and the light from the luminous body is not changed by any change of the resistance owing to the slip ring and brush. Also, noise of the slip ring and the brush is not heard, and the annular transparent portion 19*a* is not contaminated by carbon generated by the friction of the slip ring and the brush.

In the above embodiment, although only one luminous body 20 is described, one or more luminous bodies may be used.

What is claimed is:

1. A flasher type fish sonar comprising:
    a case,
    a circuit board mounted in the case,
    a motor attached to the circuit board, the motor including a rotary shaft,
    a light conducting disk fixed to the rotary shaft of the motor, the light conducting disk including a projecting portion for mounting the light conducting disk, a luminous portion and a light conducting portion for conducting light to the luminous portion,
    a shadow disk fixed to the luminous portion of the light conducting disk, the shadow disk including a slit through which light is adapted to pass from the luminous portion of the light conducting disk,
    a front display provided at a front of the shadow disk,
    a luminous element connected with the circuit board opposite to the light conducting portion of the light conducting disk which conducts light to the luminous portion,
    a fish sonar circuit for inputting signals of a surface of a body of water, fish in the body of water and a bottom of the body of water, and
    a piezoelectric vibrator connected to the fish sonar.

2. A flasher type fish sonar as set forth claim 1, wherein:
    the rotary shaft includes a threaded portion,
    the projecting portion of the light conducting disk includes a threaded portion which is threadedly engaged with the threaded portion of the rotary shaft, and
    further comprising a nut and a fixed part attached to an inner hollow portion of the projecting portion of the light conducting disk in order to fix the light conducting disk to the rotary shaft of the motor.

3. A flasher type fish sonar as set forth claim 1, wherein the front display includes:
    an opaque inner central portion including a graduation showing a depth of the sea, and
    an annular transparent portion positioned around the central portion and through which light from the slit is passed through.

\* \* \* \* \*